(12) United States Patent
Moon

(10) Patent No.: US 11,517,834 B2
(45) Date of Patent: Dec. 6, 2022

(54) FIBER DISC FILTER HAVING STRUCTURE FOR PREVENTING DAMAGE TO FABRIC FILTER

(71) Applicant: NORDIC WATER PRODUCTS AB, Mölndal (SE)

(72) Inventor: Chan Yong Moon, Seoul (KR)

(73) Assignee: NORDIC WATER PRODUCTS AB, Mölndal (SE)

( * ) Notice: Subject to any disclaimer, the term of this patent is extended or adjusted under 35 U.S.C. 154(b) by 0 days.

(21) Appl. No.: 16/980,051

(22) PCT Filed: Feb. 21, 2019

(86) PCT No.: PCT/KR2019/002137
§ 371 (c)(1),
(2) Date: Sep. 11, 2020

(87) PCT Pub. No.: WO2019/177278
PCT Pub. Date: Sep. 19, 2019

(65) Prior Publication Data
US 2021/0008473 A1   Jan. 14, 2021

(30) Foreign Application Priority Data

Mar. 15, 2018   (KR) .......................... 10-2018-0030013

(51) Int. Cl.
*B01D 33/23*       (2006.01)
*B01D 33/48*       (2006.01)
(52) U.S. Cl.
CPC ............. *B01D 33/23* (2013.01); *B01D 33/48* (2013.01); *B01D 2201/082* (2013.01)
(58) Field of Classification Search
CPC .. B01D 33/23; B01D 33/48; B01D 2201/082; B01D 33/503; B01D 33/44; B01D 33/80
(Continued)

(56) References Cited

U.S. PATENT DOCUMENTS 4,162,982 A * 7/1979 Chesner ................. B01D 33/23
                                                              210/486
8,118,175 B2   2/2012 Davis et al.

FOREIGN PATENT DOCUMENTS

DE        2455967        6/1976
EP        2514500        10/2012
(Continued)

OTHER PUBLICATIONS

English Machine Translation of KR101039326B1 (Year: 2011).*

*Primary Examiner* — Madeline Gonzalez
(74) *Attorney, Agent, or Firm* — Global IP Counselors, LLP

(57) ABSTRACT

The present invention relates to a fabric disc filter having a structure for preventing damage to a filter panel. In this regard, an object of the present invention is to provide a fabric disc filter having a structure for preventing damage to filter panel, being capable of preventing the filter panel attached to the filter panel from being torn or being disconnected from the filter frame in the washing process of suctioning and removing foreign matter. To accomplish this object, the present invention provides a fabric disc filter having a structure for preventing damage to filter panel, the fabric disc filter including: a rotary drum; and a plurality of filter segments arranged on an outer circumferential surface of the rotary drum, wherein each of the filter segments includes: a segment frame that is partially open so as to enable inlet of a fluid therethrough, and being configured to discharge the inlet fluid to the rotary drum; a filter frame assembled to the segment frame so as to be positioned on the fluid inlet side of the segment frame; a filter panel provided in the filter frame so as to filter foreign matter in the fluid flowing therethrough; and a rod-shaped stopper provided in the filter panel so as to distribute a load applied to the filter (Continued)

panel in a washing process of the filter panel and couple the filter panel to the filter frame or the segment frame.

5 Claims, 8 Drawing Sheets

(58) Field of Classification Search
USPC .............. 210/402–404, 358, 331, 346, 486
See application file for complete search history.

(56) References Cited

FOREIGN PATENT DOCUMENTS

| KR | 20100117824 | 11/2010 |
| KR | 101039326 B | 6/2011 |
| KR | 101352678 B | 1/2014 |
| KR | 101661916 B | 10/2016 |
| KR | 101876405 B | 7/2018 |
| WO | 9735656 | 10/1997 |

* cited by examiner

FIBER DISC FILTER HAVING STRUCTURE FOR PREVENTING DAMAGE TO FABRIC FILTER

CROSS-REFERENCE TO RELATED APPLICATIONS

This application is a § 371 national stage entry of International Application No. PCT/KR2019/002137, filed Feb. 21, 2019, which claims priority of South Korean National Application No. 10-2018-0030013, filed Mar. 15, 2018, the entire contents of which are incorporated herein by reference.

TECHNICAL FIELD

The present invention relates to a fabric disc filter and, more particularly, to a fabric disc filter including a rod-shaped stopper so as to distribute a load applied to a filter panel in a washing process to suction and remove foreign matter collected in the filter panel and also to enable the end of the filter panel to be additionally supported by a segment frame, thereby being capable of preventing damage to the filter panel in the washing process.

BACKGROUND ART

Recently, discharge water quality standards of the water treatment plants have been enhanced. According to this, filter installations such as fabric disc filters that are used as a tertiary treatment installation are also required to enhance treatment efficiency thereof. In this regard, as the final discharge water quality depends upon performance of the fabric disc filter, improvement in the washing equipment used in washing the fabric disc filter is also required.

FIG. 1 is a front elevation view of a fabric disc filter according to the related art, FIG. 2 is a perspective view of a filter unit used in the fabric disc filter according to the related art, and FIG. 3 illustrates a suctioning and washing process of the fabric disc filter according to the related art.

A fabric disc filter includes a rotary drum 10 in a cylindrical shape, being rotational in a horizontal position, and a plurality of filter segments 20 arranged axially on an outer circumferential surface of the rotary drum 10 along an outer circumference of the rotary drum 10.

The fabric disc filter configured as described above is arranged so as to cause a part or the whole part thereof to sink in a waterway or a water tank, and raw water of the waterway or the water tank flows into the rotary drum 10 through the filter segments 20 and is discharged outside through the rotary drum 10.

In a process that raw water flows in through the filter segments 20, foreign matter included in the raw water is filtered out by a filter panel 21 constituting the filter segments 20. The raw water from which foreign matter is removed, that is, the treated water, flows into the rotary drum 10. After being filtered by the plurality of the filter segments 20, the treated water having passed through the rotary drum 10 is discharged to a water collection device.

In the filter treatment process of the raw water as described above, foreign matter may remain on the surface of the filter panel 21. If neglected, the foreign matter would block pores of the filter panel 21, thereby degrading the filtering efficiency. Particularly, use of a flocculation-filtration method to flocculate and filter foreign matter in the raw water by means of a chemical (flocculant) could cause the flocculated foreign matter to easily block the pores of the filter panel, thereby further degrading the filtering efficiency.

In this regard, a washing device 30 to wash foreign matter attached to the surface of the filter panel is together provided in configuring a fabric disc filter.

The washing device mainly employs a water injection method to inject water at high pressure and a suction method to suction and remove foreign matter attached to the surface of the filter panel. FIG. 3 illustrates a process of removing foreign matter by means of a suction type washing device 30.

During a process by the suction type washing device 30 to remove foreign matter, the rotary drum 10 and the filter segments 20 arranged thereon are maintained in the rotational state thereof whereas a suction holder 31 which suctions and removes the foreign matter comes close with the filter panel 21 maintained in a suspension state.

In a process by the suction holder 31 to suction the foreign matter attached to the filter panel 21, a part of the filter panel 21 comes close contact with the suction holder 31 because of the suction force formed in the suction holder 31. In this state, if the filter segments are moved by rotation of the rotary drum, the suction holder functions to strongly pull the filter panel in an opposite direction to the rotational direction of the rotary drum. This may result in tearing the filter panel, thereby causing damage to the filter panel, and disintegrating coupling of the filter panel and the filter frame, thereby causing the filter panel to be partially separated from the filter frame.

DOCUMENTS OF RELATED ART

Patent Documents (Patent Document 1) Korean Patent No. 10-1352678 issued on Jan. 16, 2014
(Patent Document 2) Korean Patent No. 10-1718338 issued on Mar. 21, 2017

DISCLOSURE

Technical Problem

The present invention has been made to solve the above-mentioned problem of the related art, and an object of the present invention is to provide a fabric disc filter having a structure for preventing damage to a filter panel, particularly preventing the filter panel from being torn or being separated from the filter frame in a washing process to suction and remove foreign matter attached to the filter panel.

Technical Solution

In order to accomplish the above object and execute a task to overcome the defect of the related art, the present invention provides a fabric disc filter having a structure for preventing damage to filter panel, the fabric disc filter including: a rotary drum; and a plurality of filter segments arranged on an outer circumferential surface of the rotary drum, wherein each of the filter segments includes: a segment frame that is partially open so as to enable inlet of a fluid therethrough, and being configured to discharge the inlet fluid to the rotary drum; a filter frame assembled to the segment frame so as to be positioned on the fluid inlet side of the segment frame; a filter panel provided in the filter frame so as to filter foreign matter in the fluid flowing therethrough; and a rod-shaped stopper provided in the filter panel so as to distribute a load applied to the filter panel in a washing process of the filter panel and couple the filter panel to the filter frame or the segment frame.

In the fabric disc filter having a structure for preventing damage to a filter panel, the rod-shaped stopper may be provided in the filter panel so as to be parallel to a side part connecting an upper end and a lower end of the segment frame to each other.

In the fabric disc filter having a structure for preventing damage to a filter panel, the rod-shaped stopper may be provided in an end of the filter panel so as to be positioned inside the segment frame or inside the filter frame when the segment frame and the filter frame are assembled to each other, the rod-shaped stopper being configured to have a cross-section of a size greater than a gap between the segment frame and the filter frame.

The fabric disc filter having a structure for preventing damage to a filter panel may further include a pocket fixedly sewn to the filter panel, the pocket having a space into which the rod-shaped stopper is fixedly inserted.

In the fabric disc filter having a structure for preventing damage to a filter panel, the rod-shaped stopper may be arranged to be positioned on one side in a rotational direction among four sides of the filter frame formed in a curved trapezoidal shape.

Advantageous Effects

According to the present invention, the rod-shaped stopper provided in the filter panel functions to evenly distribute a load applied to the filter panel when the filter panel is pulled by the suction force in the washing process of the filter panel, thereby being effective in preventing the filter panel from being torn and damaged.

Also, the rod-shaped stopper prevents separation of the filter panel from the filter frame fastened on the segment frame when the filter panel is pulled, thereby being effective in extending the working life of the filter panel.

MODE FOR INVENTION

Hereinafter, the present invention will be described in detail. In describing the present invention, detailed description of any disclosed relevant function or configuration may be omitted where it is determined that such detailed description may unnecessarily make the subject matter of the present invention unclear.

Figure 1:
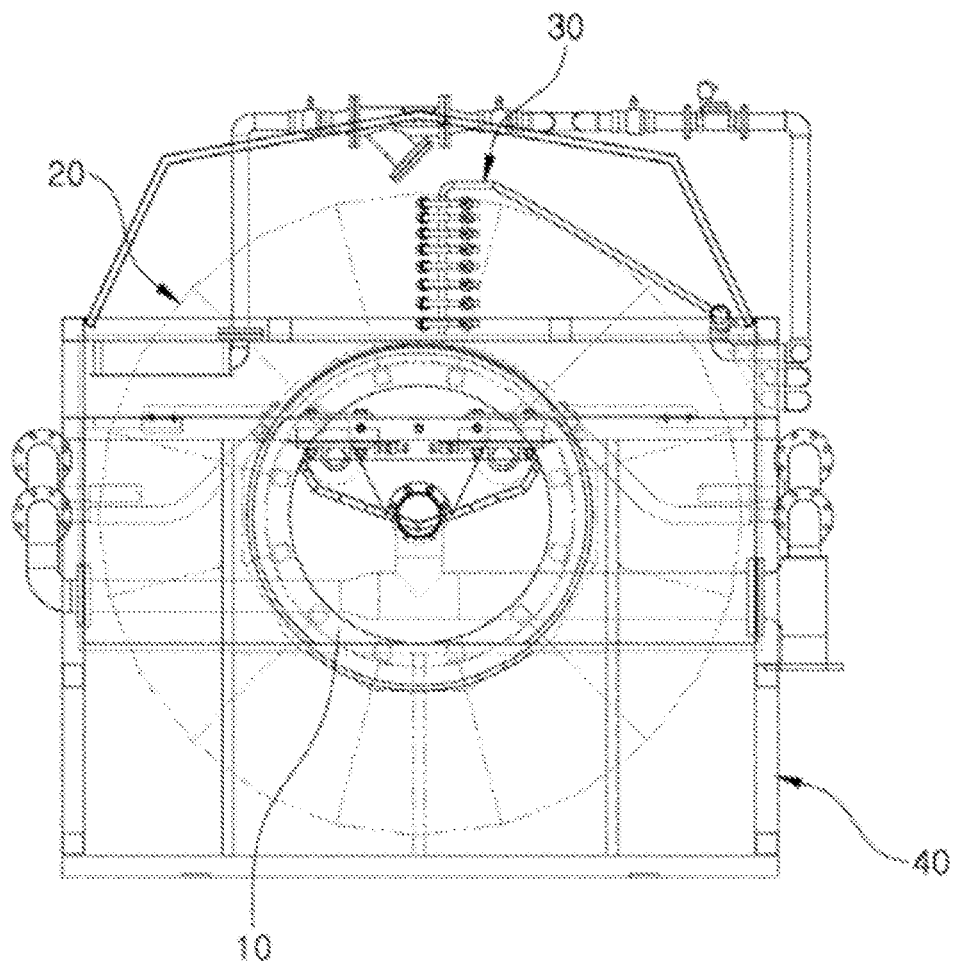
FIG. 1 is a front elevation view of a fabric disc filter according to the related art.
Figure 2:
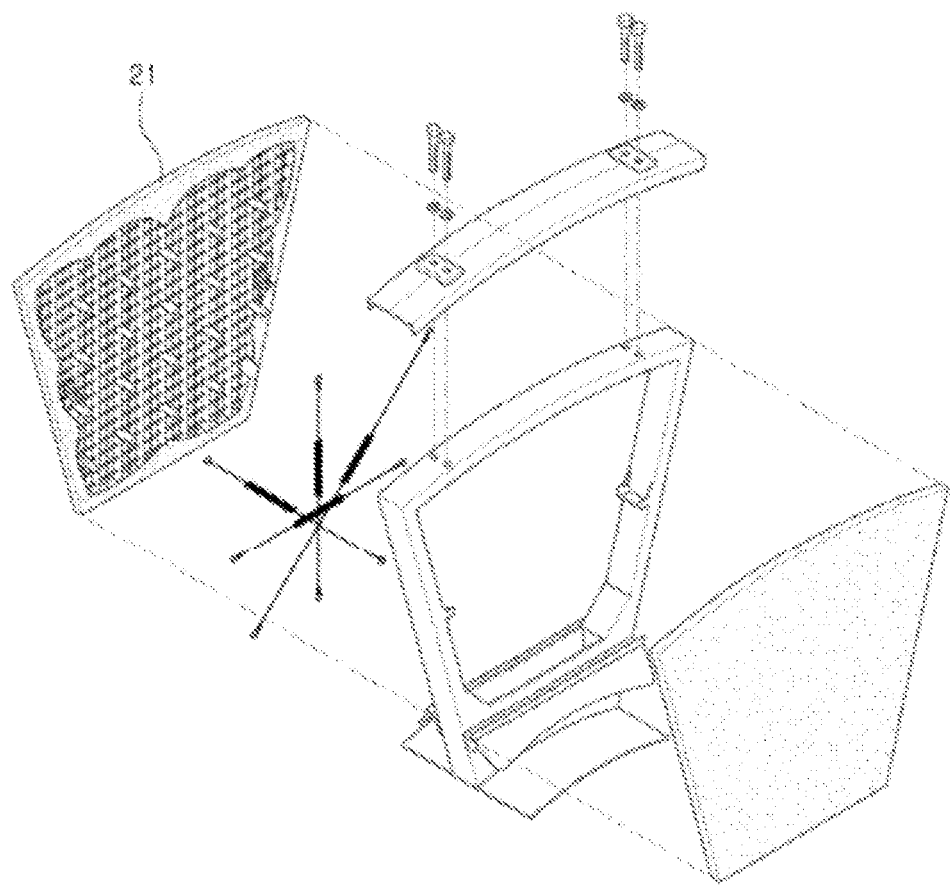
FIG. 2 is a perspective view of a filter unit employed in the fabric disc filter according to the related art.
Figure 3:
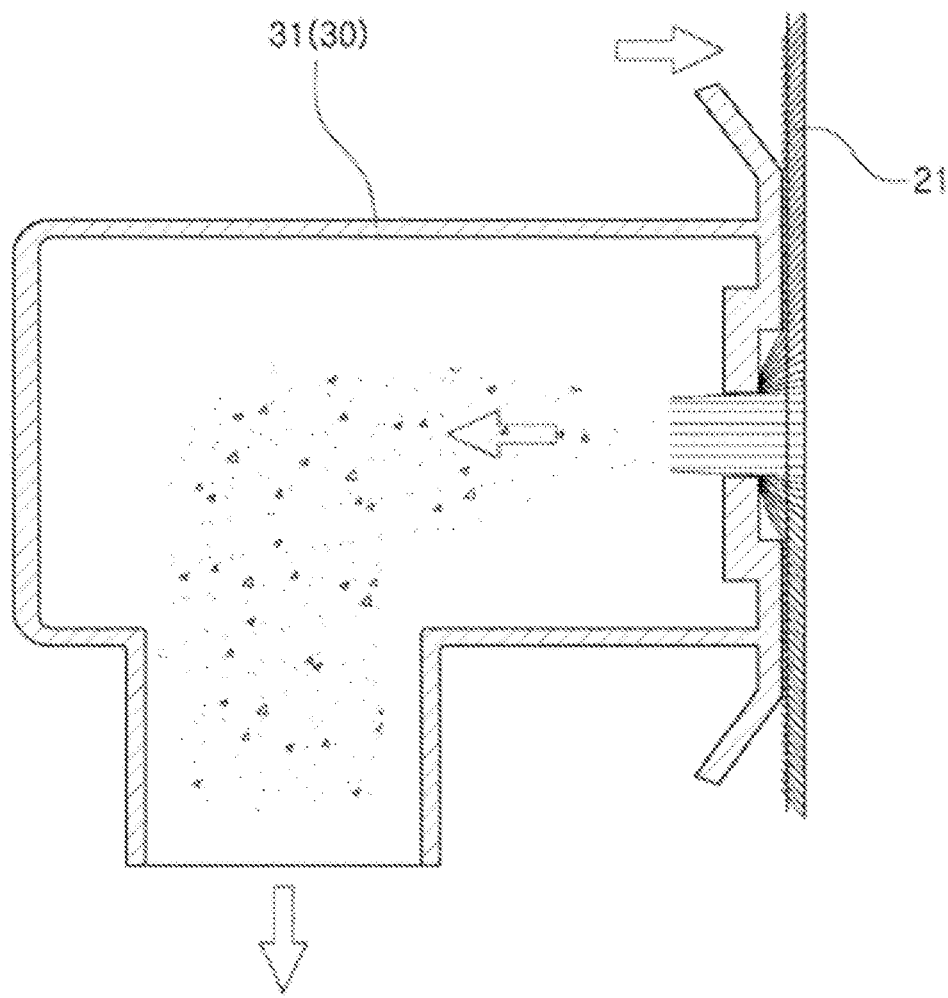
FIG. 3 is a view illustrating a suction and washing process of the fabric disc filter according to the related art.

A fabric disc filter according to the present invention includes a rotary drum 10 and a filter segment 20. The entire structure of the fabric disc filter is illustrated in FIG. 1.

The rotary drum 10 is in a cylindrical shape having a cross-section in a circle or a polygon and is configured to be rotated in a horizontal position.

The rotary drum 10 has a structure to be rotatable in a waterway or a water tank and is configured to connected to a driving device (not shown) so as to be rotated by the driving device.

The filter segment 20 filters raw water flowing into the inside of the rotary drum 10 from the waterway or the water tank, and multiple filter segments 20 are constructed. A multiplicity of the filter segments 20 are arranged on an outer circumferential surface of the rotary drum 10 along the circumference of the rotary drum 10, and also along an axial direction of the rotary drum 10.

Configurations of the rotary drum 10 and the filter segments 20 may be the same as those of the fabric disc filter that has already been used widely.

Figure 4:
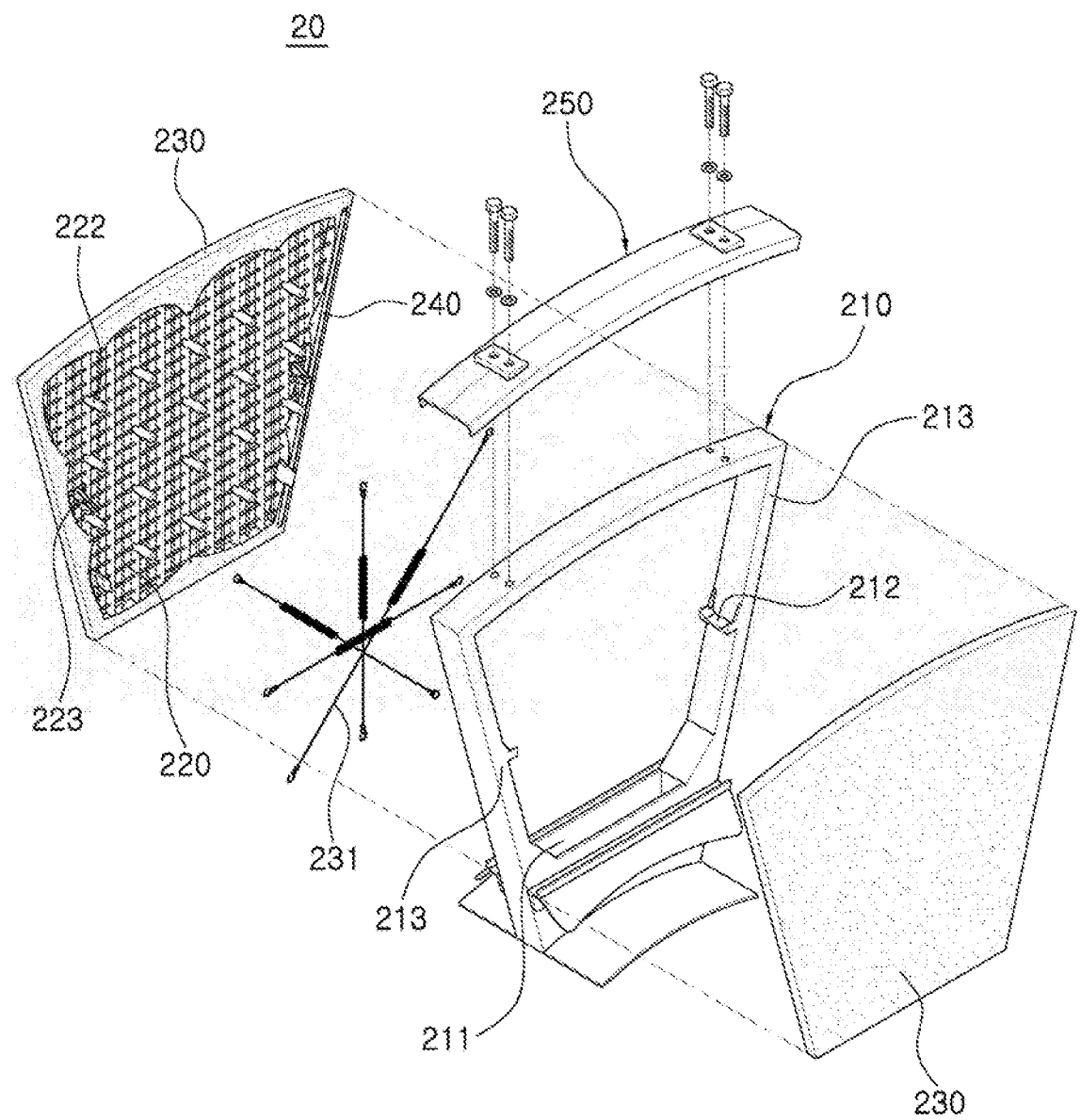
FIG. 4 is a perspective view showing a structure of a filter segment according to an exemplary embodiment of the present invention.
Figure 5:
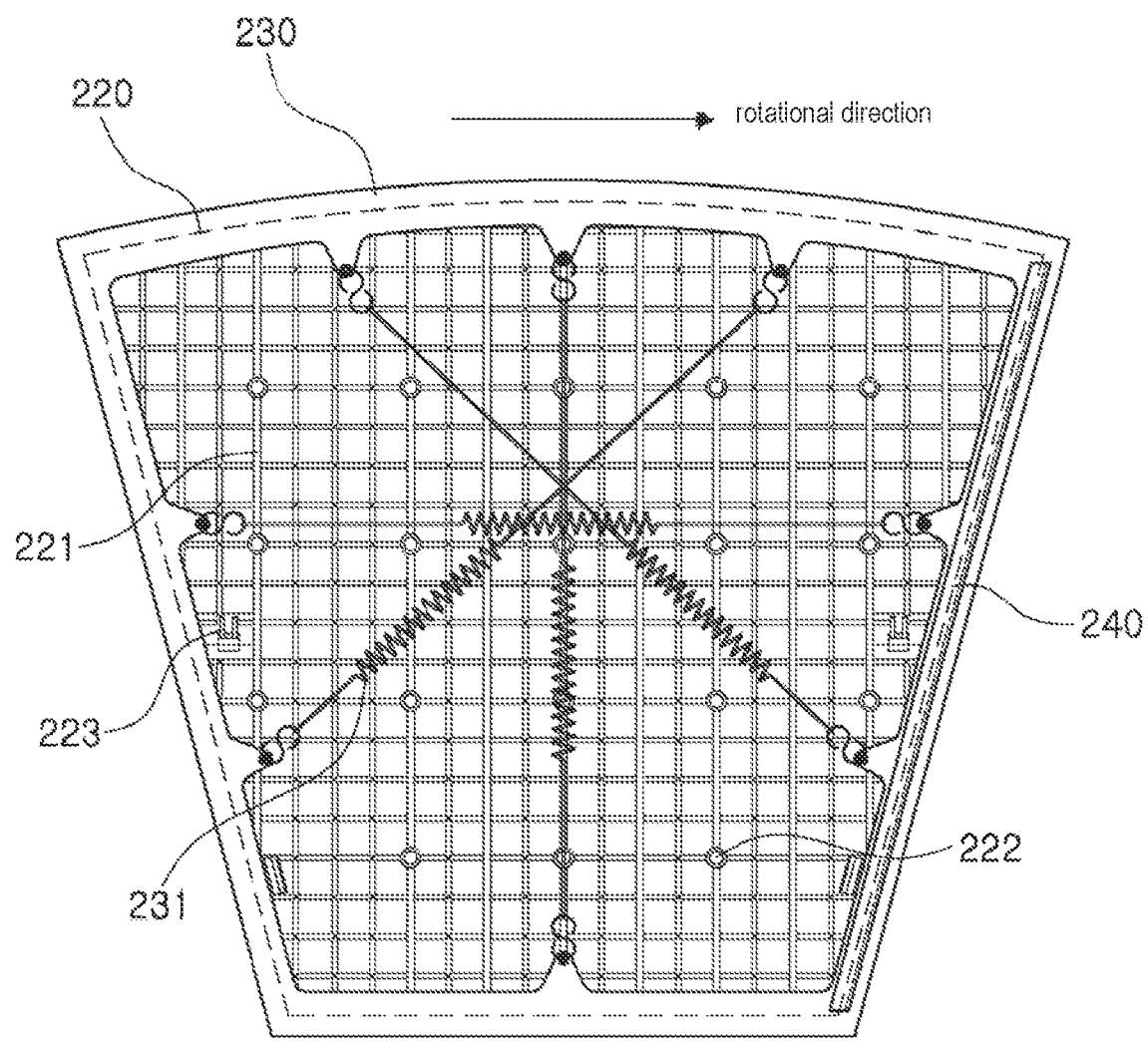
FIG. 5 is a rear elevation view showing a state that a filter panel is provided in the filter frame according to an exemplary embodiment of the present invention.
Figure 6:
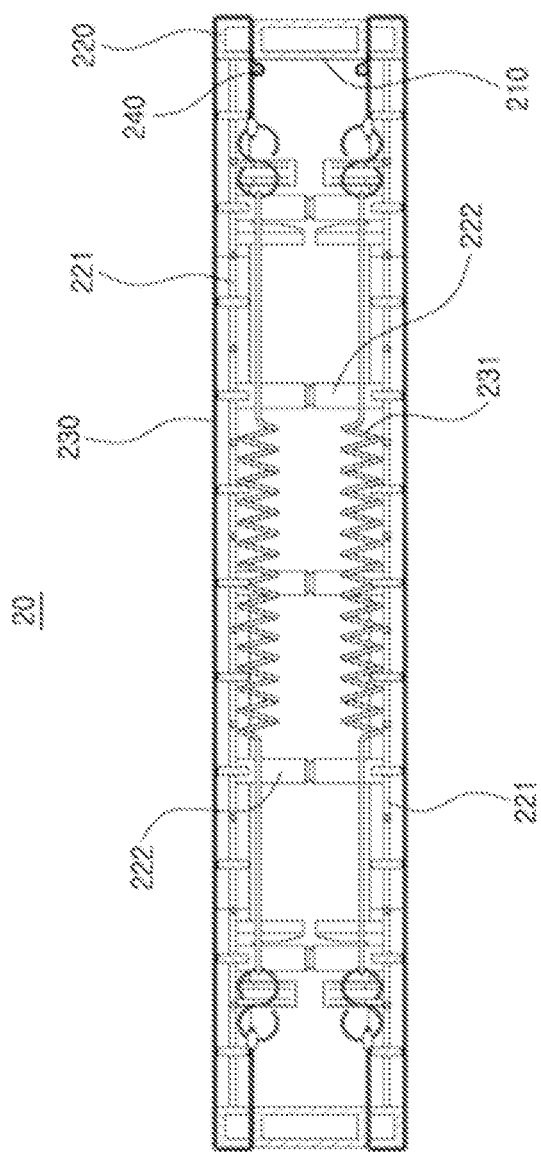
FIG. 6 is a cross-sectional view of the filter segment according to an exemplary embodiment of the present invention.
Figure 7:
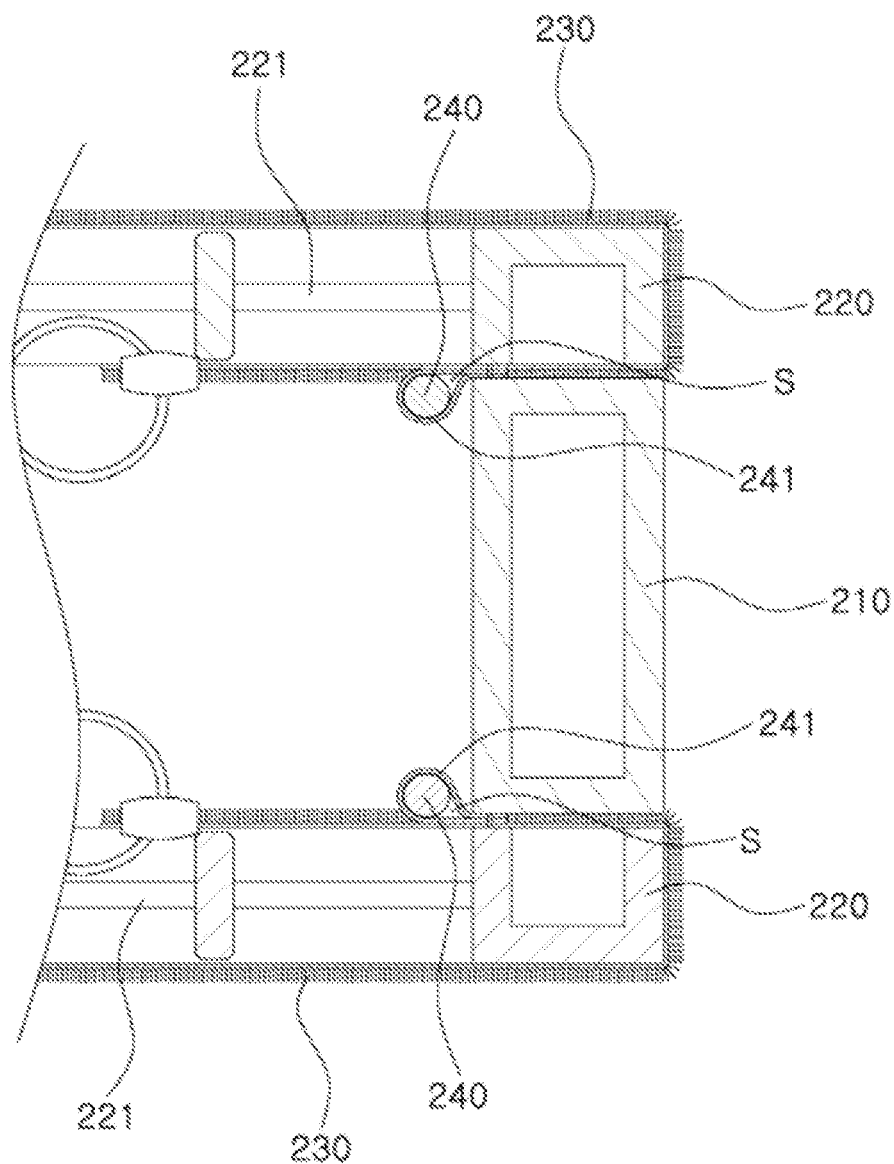
FIGS. 7 and 8 are exploded views showing a structure including a rod-shaped stopper installed according to exemplary embodiments of the present invention.
Figure 8:
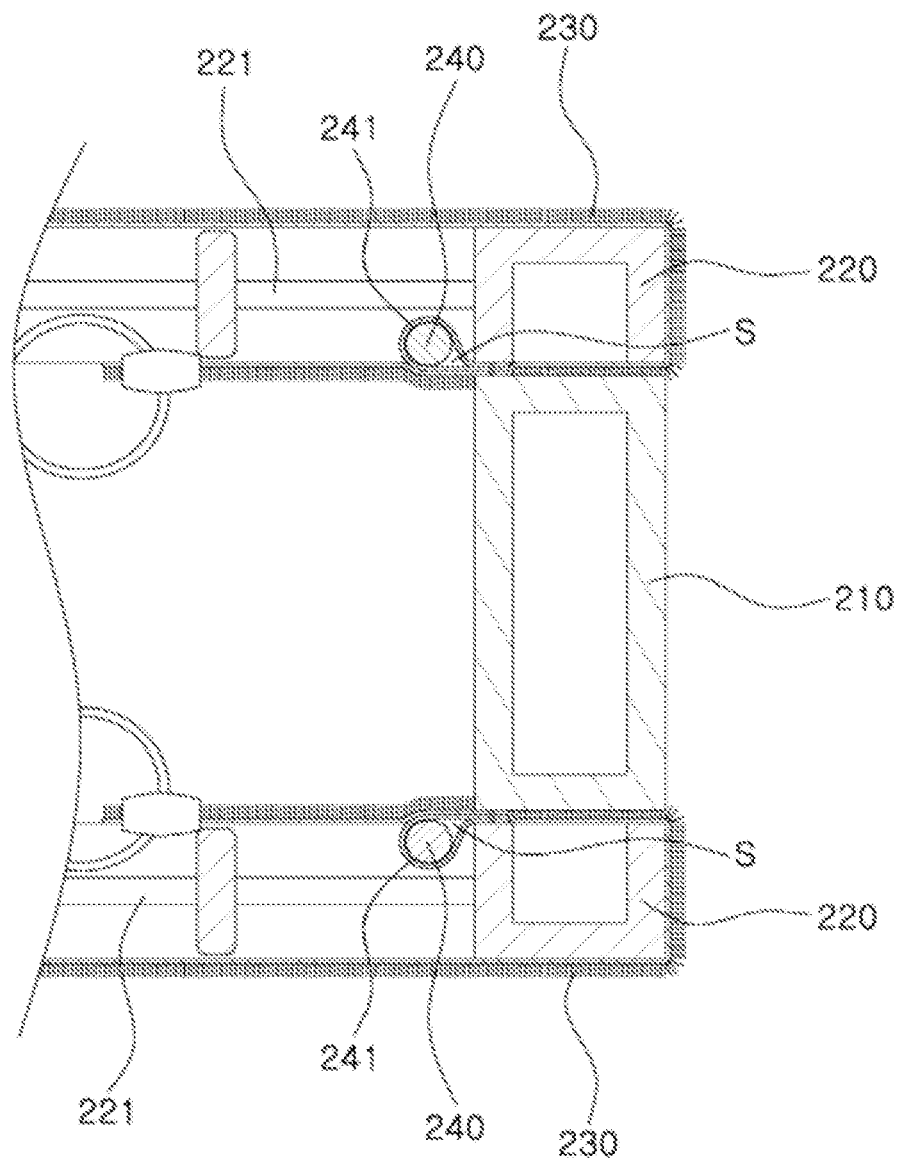

FIG. 4 is a perspective view showing a structure of a filter segment according to an exemplary embodiment of the present invention, FIG. 5 is a rear elevation view showing a state that a filter panel is provided in the filter frame according to an exemplary embodiment of the present invention, FIG. 6 is a cross-sectional view of the filter segment according to an exemplary embodiment of the present invention, FIG. 7 is an exploded view showing a structure that a rod-shaped stopper is arranged according to an exemplary embodiment of the present invention, and FIG. 8 is an exploded view showing a structure that a rod-shaped stopper is provided in an inside of the filter frame according to an exemplary embodiment of the present invention.

Each of the filter segments 20 according to the present invention is configured with a segment frame 210, a filter frame 220, a filter panel 230, and a rod-shaped stopper 240.

As a frame to constitute a basic structure of the filter segment 20 and be assembled to the rotary drum 10, the segment frame 210 is formed in a curved trapezoidal shape. The segment frame 210 is configured with a front surface and a rear surface which face each other and are opened so as to allow the fluid to flow in and out, and a discharge hole 211 is formed in a structure to pass through a lower end of the segment frame 210, thereby allowing the fluid flowing in through the opened front and rear surfaces thereof to be discharged to the rotary drum 10.

As a frame to support the filter panel 230, the filter frame 220 is formed in a curved trapezoidal shape like the segment frame 210, so as to cover the opened front and rear surfaces of the segment frame 210, and is configured with a front surface and a rear surface which are opened so as to allow the fluid to flow in and out. The filter frame 220 includes a grid type rib 221 formed inside thereof, and a multiplicity of space bars 222 formed on the intersection portions of the grid type rib 221.

The filter frame 220 is assembled respectively to the opened front surface and the opened rear surface of the segment frame 210, covering the front surface and the rear surface thereof. The space bars 222 of two filter frames 220 assembled respectively to the front surface and the rear surface of the segment frame 210 face each other in contact with each other. Accordingly, the two filter frames 220 and the filter panels 230 arranged thereon can maintain a predetermined gap without regard to water pressure of the raw water.

The filter frames 220 assembled to the front surface and the rear surface of the segment frame 210 can be firmly fixed to the segment frame 210 according to engagement of an engagement piece 212 and an elastic engagement loop 223, and by a cover 240 assembled to an upper end of the segment frame 210.

That is, the engagement piece 212 is formed in a protruding manner toward the inside of the segment frame 210 from the two side parts 213 connecting an upper end and a lower end of the segment frame 210, and the elastic engagement loop 223 protrudes toward a segment frame 210 direction from the rear surface of the filter frame 220 (a surface facing the segment frame) at a position corresponding to the engagement piece 212 so as to be engaged with the engagement piece 212 when the segment frame 210 and the filter frame 220 are assembled to each other.

Also, the cover 250 is assembled with an upper end of the segment frame 210 by means of bolt coupling in such a structure that can be disassembled. The cover 250 has a bottom surface that is opened, that is, a cross-section of '⊏', so as to enclose a part of the upper end of the filter frame 220 assembled to the front surface and the rear surface of the segment frame 210 when the cover 250 is assembled to the segment frame 210.

The filter panel 230 is made of a fabric material, on one surface of which villi are formed, and is provided in the filter frame 220 so as to block the front surface of the filter frame 220 (a surface which does not face the segment frame).

At this time, the filter panel 230 is provided in the filter frame 220 so as to block the front surface of the filter frame 220, that is, a surface which does not face the segment frame 210 and at the same time to direct the villi outwardly.

The filter panel 230 is provided in the filter frame 220 in such a form as to cover the front surface of the filter frame 220. A multiplicity of elastic retainers 231 is arranged on the rear surface of the filter frame 220 in such a manner that the filter panel 230 arranged as described above can be maintained in a tight state. The multiplicity of elastic retainers 231 mutually intersect so as to interconnect the ends of the filter panel 230 enclosing the filter frame 220, thereby stretching the filter panel 230 in a tight state.

The rod-shaped stopper 240 is provided in the filter panel 23 as a member that functions to distribute a load applied to the filter panel 230 in the washing process of the filter panel 230 and to hold the filter panel 230 so as to prevent the filter panel 230 from being pulled because of the suction force formed in the suction holder. The rod-shaped stopper 240 is fixedly provided in the end of the filter panel 230, thereby performing a required function as the rod-shaped stopper 240 is interfered with by the filter frame 220 or the segment frame 210.

More specifically, the rod-shaped stopper 240 is formed of a member having a cross section in any one of a circle, an oval, or a polygon in a rod shape elongated to the vertical direction of the filter frame 220. The rod-shaped stopper 240 is provided in the end of the filter panel 230 so as to be parallel to the side part 213 of the segment frame 210.

The rod-shaped stopper 240 installed along an end of the filter panel 230 so as to be parallel to the side part 213 of the segment frame 210 as described above is positioned inside the segment frame 210 or inside the filter frame 220 when the segment frame 210 and the filter frame 220 are assembled. The rod-shaped stopper 240 is configured to have a cross section of a size greater than a gap formed between the segment frame 210 and the filter frame 220, so as to prevent removal of the rod-shaped stopper 240.

For reference, FIG. 7 shows a structure of the rod-shaped stopper 240 positioned inside the segment frame 210 so as to prevent disassembling therefrom, and FIG. 8 shows a structure of the rod-shaped stopper 240 positioned inside the filter frame 220 so as to prevent disassembling therefrom.

The rod-shaped stopper 240 installed as described above prevents the filter panel 230 from being pulled by interference with the filter frame 220 or the segment frame 210 when the filter panel 230 is pulled by a suction force and a rotation force formed in the washing operation of the filter segment 20. The rod-shaped stopper 240 is fixedly installed at the filter panel 230 by a pocket 241.

The pocket 241 may be made of a material such as fabric and may be configured to be sewn to the filter panel 230 so as to form a pole-shaped space S into which the rod-shaped stopper 240 is fixedly inserted.

By use of the pocket 241, the rod-shaped stopper 240 can be installed at the filter panel 230 easily and firmly, and it can also be easily installed in the filter panel 230 already produced.

The rod-shaped stopper 240 may be installed at all the four sides of the filter frame 220 in a curved trapezoidal shape. However, as already described above, the rod-shaped stopper 240 is to prevent damage that may be caused to the filter panel 230 in the washing operation of the filter panel 230. Accordingly, considering the pulled direction of the filter panel 230 during the washing operation, it is preferable that the rod-shaped stopper 240 is installed only at one side, among the four sides of the filter frame 220, and installed in a rotational direction side on the basis of the rotation direction of the rotary drum 10.

Like other fabric disc filters in general use, a fabric disc filter according to the present invention configured as described above is configured so as to have a part or all of a plurality of filter segments 20 installed on an outside of the rotary drum 10 sunken in the waterway or water tank and moved due to rotation of the rotary drum 10 along a circular path. In this process, the raw water flows into the rotary drum 10, thereby performing the filtering of the raw water.

In the filtering process of the raw water, a variety of foreign matter is collected on a surface of the filter panel 230, and the foreign matter is removed from the filter panel 230 through the washing process.

In the washing process, where the foreign matter collected at the filter panel 230 is suctioned by means of the suction holder 31, the filter panel 230 comes into close contact with the suction holder 31 by the suction force formed in the suction holder 31.

Generally, as the rotary drum 10 maintains the rotational state thereof during the washing process, the filter panel 230 in close contact with the suction holder 31 is pulled in an opposite direction to the rotational direction of the rotary drum 10. At this time, the rod-shaped stopper 240 installed at the filter panel 230 operates, thus preventing damage to the filter panel 230.

That is, when the filter panel 230 is pulled by the suction force and the rotation force, the load applied to the filter panel 230 is distributed along the lengthwise direction of the rod-shaped stopper 240. Accordingly, as the load is concentrated on a specific portion of the filter panel 230, the filter panel 230 can be prevented from being torn.

Also, the rod-shaped stopper 240 is positioned inside the segment frame 210 or inside the filter frame 220 when the filter frame 220 and the segment frame 210 are assembled. As the rod-shaped stopper 240 is configured to have a cross-section area greater than a gap formed between the filter frame 220 and the segment frame 210, movement of the rod-shaped stopper 240 is limited as it is caught in the combination part of the filter frame 220 and the segment frame 210 when the filter panel 230 is pulled by the suction force and the rotation force. Accordingly, ends of the filter panel 230 are drawn into the gap between the filter frame 220 and the segment 210, thereby being capable of preventing the filter panel 230 from being separated from the filter frame 220.

As described thus far, the fabric disc filter according to the present invention prevents the filter panel 230 from being damaged, which may be caused in the washing process of the filter panel 230, thereby being capable of preventing any loss due to damage to the filter panel 230. Accordingly, a decrease in the filtering efficiency, and an increase in maintenance costs and manpower are prevented.

The present invention is not limited to the exemplary embodiments as described above. It should be appreciated that various equivalents and modifications, etc. are possible by a person skilled in the art, without departing from the scope and spirit of the invention as disclosed in the accompanying claims.

| [Description of the symbols] | |
| --- | --- |
| 10: Rotary drum | 20: Filter segment |
| 210: Segment frame | 211: Discharge hole |
| 213: Side part | 220: Filter frame |
| 230: Filter panel | 240: Rod-shaped stopper |
| 241: Pocket | |

The invention claimed is:

1. A fabric disc filter having a structure for preventing damage to a filter panel, the fabric disc filter comprising:
   a rotary drum; and
   a plurality of filter segments arranged on an outer circumferential surface of the rotary drum,
   wherein each of the plurality of filter segments includes:
   a segment frame that is partially open to allow inlet of a fluid therethrough, and is configured to discharge the inlet fluid to the rotary drum;
   a filter frame assembled to the segment frame and positioned on the fluid inlet side of the segment frame;
   a filter panel provided in the filter frame to filter foreign matter in the fluid flowing therethrough;
   a rod-shaped stopper provided in the filter panel to distribute a load applied to the filter panel in a washing process of the filter panel and couple the filter panel to the filter frame or the segment frame; and
   a pocket fixedly sewn to the filter panel, the pocket including a space into which the rod-shaped stopper is fixedly inserted.

2. The fabric disc filter having the structure for preventing damage to the filter panel of claim 1, wherein the rod-shaped stopper is provided in the filter panel to be parallel with a side portion connecting an upper end and a lower end of the segment frame to each other.

3. The fabric disc filter having the structure for preventing damage to the filter panel of claim 1, wherein the rod-shaped stopper is provided in an end of the filter panel to be positioned inside the segment frame or inside the filter frame when the segment frame and the filter frame are assembled to each other, the rod-shaped stopper being configured to have a cross-section of a size greater than a gap between the segment frame and the filter frame.

4. The fabric disc filter having the structure for preventing damage to the filter panel of claim 1, wherein the rod-shaped stopper is arranged to be positioned on one side in a rotational direction among four sides of the filter frame defined in a curved trapezoidal shape.

5. The fabric disc filter having the structure for preventing damage to the filter panel of claim 1, wherein the rod-shaped stopper has a cross-section in any one of a circle, an oval, and a polygon.

* * * * *